US012774950B2

(12) United States Patent
Liu et al.

(10) Patent No.: US 12,774,950 B2
(45) Date of Patent: Oct. 27, 2026

(54) ON-CHIP WIDE UV-VIS-NIR SPECTRAL SENSOR

(71) Applicant: Shenzhen Vispek Tech Co. Ltd., Shenzhen (CN)

(72) Inventors: Wei Liu, Shenzhen (CN); Jianjun Chen, Shenzhen (CN); Han Zhang, Shenzhen (CN); Wengang Wang, Shenzhen (CN)

(73) Assignee: Shenzhen Vispek Tech Co. Ltd., Shenzhen (CN)

( * ) Notice: Subject to any disclaimer, the term of this patent is extended or adjusted under 35 U.S.C. 154(b) by 156 days.

(21) Appl. No.: 18/958,657

(22) Filed: Nov. 25, 2024

(65) Prior Publication Data

US 2025/0110045 A1 Apr. 3, 2025

Related U.S. Application Data

(63) Continuation of application No. PCT/IB2023/000319, filed on Jun. 7, 2023.

(Continued)

(51) Int. Cl.

*G01N 21/33* (2006.01)
*G01J 3/28* (2006.01)
*G01N 21/359* (2014.01)

(52) U.S. Cl.

CPC ............ *G01N 21/33* (2013.01); *G01J 3/2803* (2013.01); *G01N 21/359* (2013.01); *G01J 2003/2813* (2013.01)

(58) Field of Classification Search

None

See application file for complete search history.

(56) References Cited

U.S. PATENT DOCUMENTS 7,408,145 B2 * 8/2008 Holland .................... G01J 3/36 250/221
8,781,544 B2 * 7/2014 Al-Ali ................ A61B 5/02427 600/323
9,562,848 B2 * 2/2017 Goldring ............... G01J 3/0264

FOREIGN PATENT DOCUMENTS

CN 101922969 A 12/2010
CN 106092918 A 11/2016

(Continued)

OTHER PUBLICATIONS

International Search Report, PCT/IB2023/000319, mailed Sep. 25, 2023.

*Primary Examiner* — Marcus H Taningco
(74) *Attorney, Agent, or Firm* — Wiggin and Dana LLP

(57) ABSTRACT

A spectral sensor that integrates a series of luminescent materials on a specially designed semiconductor substrate, providing full range spectral coverage from about 200 nm to about 1700 nm in wavelength (UVA-UVB-VIS-NIRI-NIRII). Components of this sensor solution include: an architecture on gold-coated ceramic substrate, a series of metal oxide emitters in the UV wavelength region (200-400 nm), a series of organic emitters in the visible wavelength region (400-800 nm), a series of organic emitters in the near-infrared wavelength region (800-1700 nm), a complementary metal-oxide-semiconductor (CMOS) UV-Vis detection (200-950 nm), an Indium gallium arsenide (InGaAs) window for NIR detection (950-1700 nm), and a micro-circuit to control illumination/detection in time series with Fourier transform filtering to remove environmental noise and to isolate signals. The highly compact integrated sensor provides fast, stable, and reproducible spectral array data that covers the full wavelength range from about 200 to about 1700 nm.

24 Claims, 14 Drawing Sheets

Related U.S. Application Data

(60) Provisional application No. 63/350,127, filed on Jun. 8, 2022.

(56) References Cited

FOREIGN PATENT DOCUMENTS

| | | | |
|---|---|---|---|
| CN | 111490060 | A | 8/2020 |
| CN | 111935905 | A | 11/2020 |
| CN | 112469977 | A | 3/2021 |
| CN | 115184280 | A | 10/2022 |
| EP | 3270125 | A1 | 1/2018 |
| WO | 2016125164 | A2 | 8/2016 |

* cited by examiner

ON-CHIP WIDE UV-VIS-NIR SPECTRAL SENSOR

CROSS-REFERENCE TO RELATED APPLICATIONS

This continuation application claims the benefit of and priority to International Patent Application No. PCT/IB2023/000319, filed Jun. 7, 2023, which claims priority to U.S. provisional patent application No. 63/350,127, filed Jun. 8, 2022, each of which are incorporated by reference in their entireties herein.

TECHNICAL FIELD

The present invention relates to an on-chip wide UV-VIS-NIR spectral sensor that integrates UV illuminating materials (e.g. metal oxides), VIS-NIR light-emitting materials (e.g. organic or coordination complexes), and photo-electric conversion windows in the UV-VIS (CMOS) and NIR region (InGaAs), on a specially designed semiconductor chip with micro control circuits. The sensor has four major components: 1. An architecture on gold-coated Aluminum nitride ceramic substrate, the architecture including; 2. Emitters: a series of UV illuminating windows (200-400 nm), a series of organic light-emitting materials coating in the visible wavelength region (400-800 nm), a series of organic light-emitting material coating in the near-infrared wavelength region (800-1700 nm); 3. Detectors: complementary metal-oxide-semiconductor (CMOS) window for detection of photons in the UV-Vis region (200-950 nm), An Indium gallium arsenide (InGaAs) window for detection of photons in the NIR region (950-1700 nm), and 4. A micro-circuit to control illumination/detection in time series with Fourier transforms filtering to remove environmental noise and to isolate signals from modulated emitters. The highly compact integrated sensor provides fast, stable, and reproducible spectral array data that covers the full wavelength range from 200 to 1700 nm. This sensor can provide a miniature, highly compact, yet wide-wavelength-range coverage for any spectral sensing purposes.

BACKGROUND

Spectroscopy is widely used in academic research, medical practice, and industrial settings to analyze the chemical contents and compositions of substances. By obtaining the interaction patterns between substance-of-interests and different energy (wavelength) of lights, the spectral response, or chemical fingerprints, can be analyzed in a real-time and non-invasive manner. There are varieties of different spectroscopic techniques which mainly differ by wavelength coverage and optical design, however, consumer-level application of spectral analyses is seldom used. The major limitation of consumer-level applications is the lack of reliable, yet miniature and cost-effective solutions for spectral analyses, particularly in the form of a compact sensor. In recent years, increasing numbers of miniature and low-cost spectral sensors have been reported by the advancement in chipset technology. However, most solutions are based on microelectromechanical systems (MEMS) technology based on silicon semiconductors. The nature of silicon limits its photon-responsibility to the UV-Vis-swNIR region (200-1000 nm), limiting its dynamic sensitivity of analyses. Sensor solutions in the Infrared region using GaAs and InP are also reported, but the cost is relatively too high for consumer-level applications. In general, in order to obtain reliable spectral analysis results, one needs to obtain wavelength coverage as wide as possible and remove environmental noise as much as possible. Particularly, there are three major problems need to be resolved before a complete solution becomes available to consumers: 1. A highly compact, integrated chipset that allows a wide range of wavelength coverage, thereby providing useful spectral responses in the UV-Vis-IR region; 2. A miniature built-in control system that allows for appropriate sensor size for consumer electronic device applications; 3. A stable signal generating/processing mechanism that provides reliable, stable spectral signals, eliminating environmental noise while allowing for the isolation of signals detected from modulated emitters.

A spectrometer or a spectral sensor generates lights with different energy (wavelength), allows lights to interact with substances of interest, and detects the response of different lights (i.e. energies) after the interaction, yielding an array of data known as a spectrum. The spectrum of different substances can be processed/interpreted manually by visualization/comparison or with an algorithm to obtain analytical results that cater to one's demands. The traditional spectrometer consists of three major components: the light source, the light-differential unit, and the detection unit. All three units are assembled in an optical geometry with precise locations. The optical geometry is usually complicated that takes up a large volume, making traditional spectrometers large in size and costive due to the varieties of sophisticated optics used. In order to shrink the size and reduce the cost of spectral sensors, many innovations have been introduced. MEMS technology has been applied to reduce the size of optical geometry, however, the silicon-based baseboard limits its sensitive wavelength range to below 1000 nm. Quantum dots and nanorod/wire material has been applied to modify the silicon-based photon array, replacing the traditional light differential units (grating or interference filter), but the miniature sensor chipset is still limited by the wavelength coverage nature of silicon materials (300-1000 nm). The InGaAs photon-convertor has been integrated with MEMS technology to provide mid-NIR coverage, yet the usage of grating and optic layout still make the solution costly. One promising approach is to utilize specially designed illuminating materials (i.e. emitters which produce a limited range of energies) to provide light differentiation, which can also reduce the cumbersome of the complicated optics layout. Due to the limitation of usable material, this approach is usually limited to a few wavelength channels and a narrow wavelength coverage range.

Organic light-emitting diode, often known as OLED, utilize organic light-emitting materials which generate light emission from the organic emissive layer (EML) upon electricity from both sides. It is commonly used in the manufacture of displays, providing low energy consumption and reliable color reproducibility. The benefits of OLED materials are the stable emission spectrum with narrow bandwidth and low energy consumption, making them ideal materials for the miniature spectral sensor. More importantly, the organic molecular structure allows easy modification to its property via adding or removing chemical groups, allowing emission spectrum fine-tuning to match the needs of demand. For example, adding more aromatic rings to the structure can generally result in redshift (to a longer wavelength) in the emission, making the tunable emission and better resolution in light-sensing possible.

The present embodiments solve existing problems by providing spectral sensing with accurate results by, in part, providing a plurality of stable light sources and by reducing environmental noise. Compared to traditional mercury and/ or halogen light source, the electrical pulses modulated LEDs and OLEDs provide better emission uniformity and reproducibility. More importantly, the digital modulated light source can be programmed into different frequency domains, allowing the removal of environmental noise via Fourier transform signal filtering and allowing simultaneous data collection from multiple light sources. By reconstruction algorithm, the digitally modulated light interaction signals can be rebuilt into a full spectral spectrum, which becomes ready for varieties of different applications.

SUMMARY

While certain exemplary embodiments are described, it can be appreciated that further embodiments within the spirit and the scope of the disclosure are contemplated. In instances where emitter characteristics are described (for instance their emitted energy ranges), it can be appreciated that any suitable material known in the art may be utilized in accordance with the present disclosure. The terms "metal oxides" and "organic" are not intended to limit the scope of useful materials but rather to provide exemplary materials which, in some embodiments, may be preferred.

In order to cover the full wavelength range from UV to mid-NIR, the UV emitting metal oxides materials, the VIS and NIR emitting organic light-emitting materials, and two detection windows, (CMOS for about 200-950 nm, InGaAs for about 950-1700 nm) are integrated on a gold-coated ceramic substrate, such as an Aluminum nitride ceramic substrate. In an embodiment, 44 different emitter materials are applied in total together spanning the range of about 200 nm-1700 nm, allowing spectral resolution of about 10-25 nm. The substrate has a UV-NIR transmitting cover glass on the top and control circuits on the back, allowing digitally modulated emission of different wavelength lights via different illuminating materials in time series. The signals picked up by detection windows are processed by Fourier transform filtering to remove environmental noise, followed by reconstruction of the full spectrum. The highly compact integrated sensor provides fast, stable, and reproducible spectral array data that covers the full wavelength range from 200 to 1700 nm. This sensor can provide a miniature, highly compact, yet wide-wavelength-range coverage for any spectral sensing purposes. Such sensors may advantageously be suitable for use in both industrial settings and consumer electronics.

In an embodiment, the present invention provides a full wavelength range spectral sensor comprising:

(a) a gold-coated insulating substrate supporting four functional zones;

(b) a first functional zone comprising a plurality of ultraviolet (UV) emitters having an emission wavelength range of about 200 nm-about 400 nm), a second functional zone comprising a plurality of visible emitters having an emission wavelength range of about 400 nm-about 800 nm, a third functional zone comprising a plurality of near-infrared (NIR) emitters having an emission wavelength range of about 800 nm-about 1700 nm), and a fourth functional zone comprising first and second detection windows, wherein the first detection window comprises one or more CMOS detectors for detecting wavelengths in the range from about 200-about 950 nm and the second detection window comprises one or more InGaAs detectors for detecting wavelengths in the range from about 950 nm-about 1700 nm, (c) a barrier wall opaque to wavelengths in the range from about 200 nm-about 1700 nm circumscribed by the first, second, and third functional zones, the barrier wall circumscribing the fourth functional zone;

(d) a UV-NIR transparent glass covering the first, second, third, and fourth functional zones and defining an interior space filled with inert gas (e.g. Nitrogen); and (e) a micro-circuit to control illumination/detection (and optionally to further perform Fourier filtering).

In an embodiment, the present invention provides spectral sensor wherein the insulating substrate is a ceramic substrate, and optionally wherein the ceramic substrate is an aluminum nitride substrate.

In an embodiment, the present invention provides a spectral sensor wherein the first functional zone is arranged at a top region of the substrate, a second functional zone is arranged below the first functional zone and on a left half of the substrate, and the third functional zone is arranged below the first functional zone and on a right half of the substrate, and wherein and the light detection zone is located substantially at the center of the substrate.

In an embodiment, the present invention provides a spectral sensor wherein each of the first functional zone, second functional zone, and third functional zone respectively comprise a plurality of bays.

In an embodiment, the present invention provides a spectral sensor wherein the first functional zone comprises from 4 to 16 bays, or alternatively no less than 4 bays, each bay comprising one or more of the plurality of UV emitters.

In an embodiment, the present invention provides a spectral sensor wherein the first functional zone has eight individual bays.

In an embodiment, the present invention provides a spectral sensor according wherein the UV emitters are for metal oxide materials supporting large electrical current during operations.

In an embodiment, the present invention provides a spectral sensor wherein the plurality of UV emitters comprises eight emitters, the emitters encompassing emission centers of about 250 nm, 260 nm, 270 nm, 280 nm, 365 nm, 375 nm, 383 nm, and 393 nm, each ±6 nm.

In an embodiment, the present invention provides a spectral sensor wherein the second functional zone comprises from 8 to 20 bays, or alternatively no less than 8 bays, each bay comprising one or more of the plurality of visible emitters.

In an embodiment, the present invention provides a spectral sensor wherein the visible emitters are organic light-emitting materials.

In an embodiment, the present invention provides a spectral sensor wherein the second functional zone has twelve bays.

In an embodiment, the present invention provides a spectral sensor wherein the plurality of visible emitters comprises sixteen emitters arranged within the twelve bays, eight being arranged as single layers of one of the plurality of visible emitters and eight being arranged as double layers of two of the plurality of visible emitters, the emitters encompassing emission centers of about 450 nm, 460 nm, 515 nm, 525 nm, 560 nm, 570 nm, 602 nm, 612 nm, 625 nm, 635 nm, 662 nm, 672 nm, 695 nm, 705 nm, 798 nm, and 808 nm, each ±6 nm.

In an embodiment, the present invention provides a spectral sensor wherein the third functional zone comprises from 4 to 16 bays, or alternatively no less than 10 bays, each bay comprising one or more of the plurality of NIR emitters.

In an embodiment, the present invention provides a spectral sensor wherein the NIR emitters are organic light-emitting materials.

In an embodiment, the present invention provides a spectral sensor wherein the third functional zone has ten bays, each bay comprising one or more of the plurality of NIR emitters.

In an embodiment, the present invention provides a spectral sensor wherein the plurality of NIR emitters comprises twenty emitters arranged within the ten bays, each bay comprising two of the plurality of emitters, the emitters encompassing emission centers of about: 845 nm, 855 nm, 884 nm, 894 nm, 928 nm, 938 nm, 967 nm, 977 nm, 993 nm, 1003 nm, 1195 nm, 1205 nm, 1291 nm, 1301 nm, 1453 nm, 1463 nm, 1531 nm, 1541 nm, 1643 nm, and 1653 nm, each ±6 nm.

In an embodiment, the present invention provides a spectral sensor wherein the fourth (detection) functional zone has first and second CMOS detection windows (200-950 nm) and first and second InGaAs detection windows (950-1700 nm), wherein the first CMOS and first InGaAs detection windows are associated with a signal channel and the second CMOS and second InGaAs detection windows are associated with a reference channel.

In an embodiment, the present invention provides a spectral sensor wherein the first, second, and third functional zones are controlled by a dimming controller to provide emission sequence in time series, and wherein the fourth (detection) functional zone is controlled by an analog front-end (AFE) controller to utilize the right window to pick up the correct signals in the time domain. (The signals are then passed to the main controller for further processing before transmission to internet/cloud-connected appliances/gadgets via BLE or USB).

In an embodiment, the present invention provides a spectral sensor, wherein each of the plurality of UV emitters are independently selected from semiconductors, quantum dots, nanoparticles, nanorods, and nanowires.

In an embodiment, the present invention provides a spectral sensor according to claim 1 wherein the visible and NIR emitters are organic emitters selected from Fluorescent dyes, Phosphorescent dyes, organic compounds, coordination complexes, conductive polymers, quantum dots, nanoparticles, nanorods and nanowires.

In an embodiment, the present invention provides a spectral sensor, wherein the micro-circuit comprises a main controller to perform Fourier transform filtering, which digitally modulates each emission light with a special frequency to avoid the usual frequency of home and industrial electricity, and wherein, after the Fourier transformation, abnormal frequencies from environments are removed, resulting in noise removal in the output signal after the reverse Fourier transformation.

In an embodiment, the present invention provides a spectral sensor wherein the returned discrete spectral data array is further fit with Gaussian elements to yield the final spectrum output;

In an embodiment, the present invention provides a system for performing substance analyses comprising:

(a) a spectral sensor;

(b) a BLE or USB connect mobile device or computer; and (d) a cloud based artificial intelligence for spectral data analyses/interpretation, wherein the spectral sensor is operational over a plurality of wavelengths selected from about 200 nm to 1700 nm.

In an embodiment, the present invention provides a method of performing spectral analysis of a substance comprising:

(a) obtaining a sensor chip comprising a plurality of LED emitters, two (signal and reference) CMOS detectors, and two (signal and reference) InGaAs detectors on a front surface thereof;

(b) orienting the front surface of the sensor to substantially face the substance;

(c) modulating one or more or a plurality of LED emitters on the sensor chip simultaneously at different frequencies;

wherein the modulated LED emitters emit light within the wavelength range from about 200-950 nm or from about 950-1700 nm;

(d) detecting, by either the CMOS detectors (200-950 nm) or InGaAs detectors (950-1700 nm), a spectral response;

(e) separating, by Fourier filtering, the spectral responses of each emitter; and (f) constructing, by gaussian peak fitting, a spectrum based upon the separated spectral responses of each emitter.

In an embodiment, the present invention provides a method further comprising removing environmental noise by Fourier filtering.

In an embodiment, the present invention provides a method wherein steps (e) and/or (f) are performed on one or more of the sensor chip, a computer or phone connected to the sensor via USB or bluetooth, or on the cloud connected via a computer or phone connected to the sensor.

In an embodiment, the present invention provides a method wherein artificial intelligence (AI) is utilized in steps (e) and/or (f).

BRIEF DESCRIPTION OF THE DRAWINGS

A more detailed understanding of the sensor design/architecture can be had from the following description of exemplary embodiments to be better understood in conjunction with the accompanying drawings.

DETAILED DESCRIPTION

An object of the invention is to provide a complete solution for manufacturing a miniature, full wavelength coverage spectral sensor, including design, functional zone geometry/arrangements, and control/processing methods. The present invention solves the problems of making a miniature spectral sensor covering both the UV-Vis-swNIR region with silicon detection (200-1000 nm) and the swNIR-midNIR with InGaAs detection (900-1700 nm), with the digitally modulated emissions which allow fast environmental noise removals. The present invention can be widely applied in a variety of daily settings, providing convenience and benefits to the life of the end-user.

Figure 1:
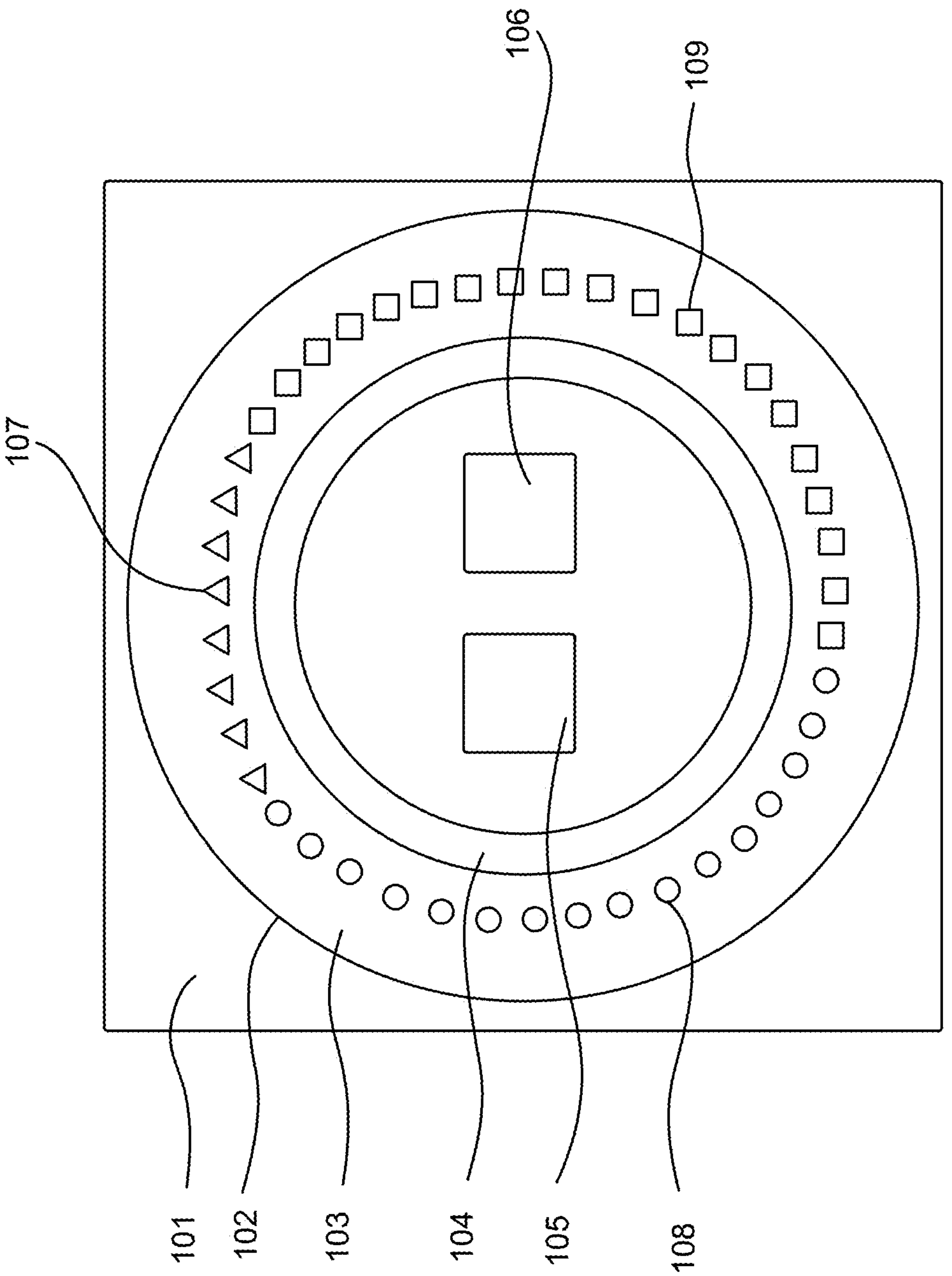
FIG. 1 illustrates a representative schematic drawing of the different illuminating materials and detection windows arrangement.

FIG. 1 illustrates a representative schematic drawing of the different lights emitting materials windows and light detection windows arrangement. All materials are coated on a gold-coated Aluminum nitride ceramic substrate (101) with four different functional zones. In some embodiments, the substrate 101 is any appropriate insulator. In some embodiments, the substrate 101 is a ceramic insulator. In some embodiments, the substrate 101 is a ceramic insulator and the ceramic insulator is aluminum nitride. The first UV lights emitting functional zone (107) includes eight different UV emitting metal oxide materials that emit lights centering from 250 nm to 393 nm. The second visible lights emitting functional zone (108) includes sixteen different organic light-emitting materials which emit lights centering from 450 nm to 808 nm. The third near-infrared lights emitting functional zone (109) includes twenty different organic light-emitting materials which emit lights centering from 845 nm to 1653 nm. The last functional zone in the center includes a CMOS detection window (105) and an InGaAs detection window (106). The last detection zone is physically isolated from the first three illumination zones with a circular metal wall (104). In an embodiment, all functional zones are covered, sealed, and protected with UV-IR transparent glass (102) in a nitrogen gas environment, avoiding oxygen and humidity damage from the air to allow longer duration and better stability. In an embodiment, one or more of the light-emitting materials and/or detectors are contained in an inert gas environment.

Figure 2B:
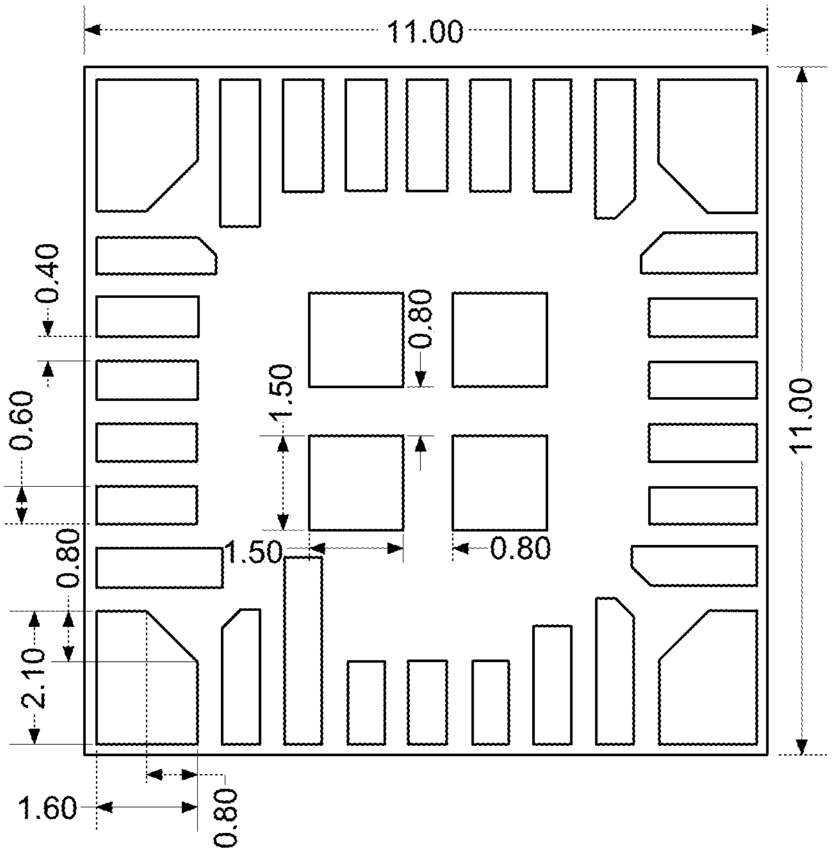
FIG. 2 Exemplary sensor geometry with size/dimensions and functional zones arrangement from the top view (FIG. 2A) and the bottom view (FIG. 2B).
Figure 2A:
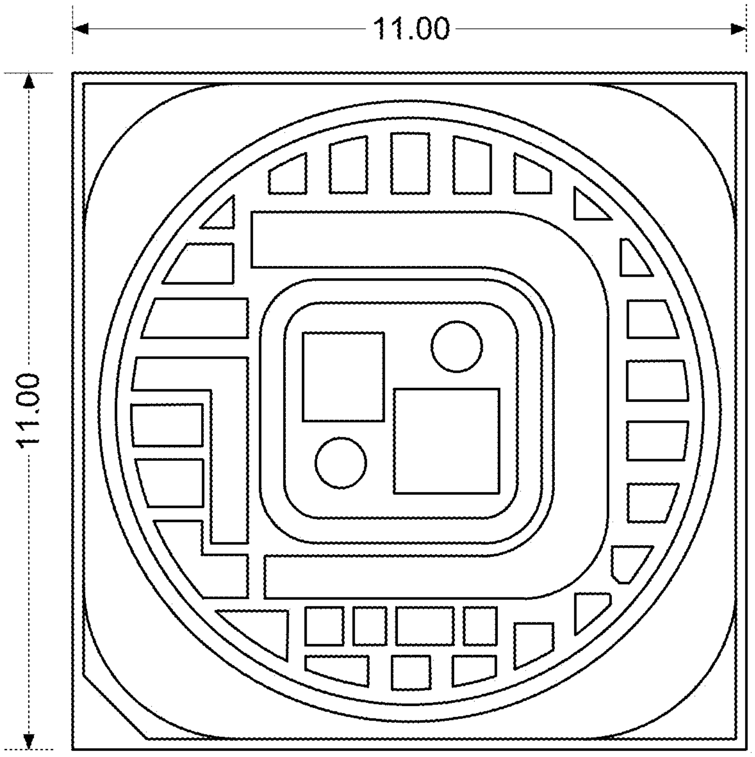

FIG. 2 is an exemplary design and architecture of the spectral sensor chipset from top view and bottom view. The exact dimension of the sensor is 11 mm×11 mm in square size, on which the functional zone takes a space of a circle with a diameter of 1 cm. The top third of the chipset is the UV lights emitting functional zone, with eight individual bays for metal oxide materials coating to allow large electrical current during operation. The left half is the visible lights emitting functional zone, with twelve metal bays for organic light-emitting materials coating, including twelve single layer coating and four double-layer coatings, allowing sixteen emission wavelengths in total. Generally, single or double layers may be applied to alter the emission characteristics. In some instances, a single layer of material A may have different emission characteristics (e.g. emission wavelength center) from a double layer of material A. In some embodiments a double layer of a material may emit at longer wavelengths than a single layer of a material. In some instances, a single layer of material A or material B may have different emission characteristics (e.g. emission wavelength center) from a double layer including a layer of A and a layer of B. Such tunability is generally understood to a person of skill in the art. The right half is the near-infrared lights emitting functional zone, with ten metal bays for infrared light-emitting coating, each bay has a half single layer and a half double-layer coating, resulting in twenty near-infrared emission wavelengths in total. The center is the light detecting functional zone, with four metal bays, the left two are the signal and reference CMOS windows for UV-Vis detection (200-950 nm) and the right two are the signal and reference InGaAs window for near-infrared detection (950-1700 nm). The bottom of the chipset includes 30 metal bays for digital signal communication on the surrounding lighting and four metal bays for detection signal readings. It can be appreciated that the number of bays at the bottom of the chipset associated with emitters may correspond with the total number of UV-, visible-, and NIR-emitting bays. Likewise, it can be appreciated that the number of bays at the bottom of the chipset associated with the detectors may correspond with the total number of detector bays. In general, it is contemplated that any architectures functionally connecting the LEDs and detectors to the other electrical components of the sensor are contemplated.

In an embodiment, the UV-emitting functional zone may have from about 4 to about 16 functional bays, or from about 4 to about 12 functional bays, or from about 6 to about 10 functional bays. In an embodiment, the UV-emitting functional zone may have about 4, or about 5, or about 6, or about 7, or about 8, or about 9, or about 10, or about 11, or about 12, or about 13, or about 14, or about 15, or about 16 functional bays. In an embodiment, the UV-emitting functional zone has no less than 4 bays.

In an embodiment, the Visible-emitting functional zone may have from about 8 to about 20 functional bays, or from about 8 to about 16 functional bays, or from about 10 to about 14 functional bays. In an embodiment, the UV-emitting functional zone may have about 6, or about 7, or about 8, or about 9, or about 10, or about 11, or about 12, or about 13, or about 14, or about 15, or about 16, or about 17, or about 18, or about 19, or about 20 functional bays. In an embodiment, the visible-emitting functional zone has no less than 8 bays.

In an embodiment, the near-infrared emitting (NIR-emitting) functional zone may have from about 10 to about 16 functional bays, or from about 10 to about 14 functional bays, or from about 10 to about 12 functional bays. In an embodiment, the UV-emitting functional zone may have about 10, or about 11, or about 12, or about 13, or about 14, or about 15, or about 16 functional bays. In an embodiment, the NIR-emitting functional zone has no less than 10 bays.

In an embodiment, the UV-emitting functional zone may have from about 4 to about 16 functional bays, the Visible-emitting functional zone may have from about 8 to about 20 functional bays, and the NIR-emitting functional zone may have from about 10 to about 16 functional bays. The sensor may have at least two detector bays, or may have four detector bays.

In an embodiment, the UV-emitting functional zone may have from about 4 to about 10 functional bays, the Visible-emitting functional zone may have from about 8 to about 14 functional bays, and the NIR-emitting functional zone may have from about 10 to about 12 functional bays. The sensor may have at least two detector bays, or may have four detector bays.

The arrangement of lighting and detection zone is specially designed and optimized to yield the highest signal-to-noise ratio and lowest electrical noise. The optimized arrangement can be described as a plurality of UV-emitting bays, a plurality of visible-emitting bays, and a plurality of NIR-emitting bays circumscribing a plurality of detector bays (typically two). In an embodiment, a plurality of UV-emitting bays, a plurality of visible-emitting bays, and a plurality of NIR-emitting bays circumscribe a metal or opaque wall, the wall in turn circumscribing a plurality of detector bays.

In some embodiments, the sensor may be described by having a plurality of functional zones, such as four functional zones. In an embodiment, a sensor comprises a first functional zone comprising a plurality of UV emitters having an emission wavelength range of about 200-about 400 nm), a second functional zone comprising a plurality of visible emitters having an emission wavelength range of about 400-about 800 nm, a third functional zone comprising a plurality of near-infrared (NIR) emitters having an emission wavelength range of about 800-about 1700 nm), and a fourth functional zone comprising first and second detection windows (i.e. CMOS and GaInAs). The term "functional zone" does not necessarily mean that the zones are completely separate from one another except for the fourth functional zone comprising the detectors, which is separated from the first three functional zones by an opaque or metal wall. In some embodiments, the first three functional zones are clearly defined from one another. In alternative embodiments, bays associated with certain functional zones might partially overlap into other functional zones. Typically, the bays having a certain type of emitter (e.g. UV, visible, or NIR) are grouped for simplicity and logical design, but embodiments having the different types of emitters in ungrouped arrangements would be functional and are contemplated within the scope of the functional zones definition.

In some embodiments, the UV emitters (i.e. the first functional zone) draws a larger current than either of the visible or NIR emitters (i.e. the second and third functional zones). The current drawn by the UV emitters may be about 80-120 mA, or about 100 mA, and may be referred to as a "large current". The current drawn by the visible and/or NIR emitters may be about 10-30 mA, or about 20 mA, and may be referred to as a "small current". Various emitters are contemplated and the exact current draws may vary in such a manner that the sensor can adequately power the necessary or desired emitters.

Figure 3:
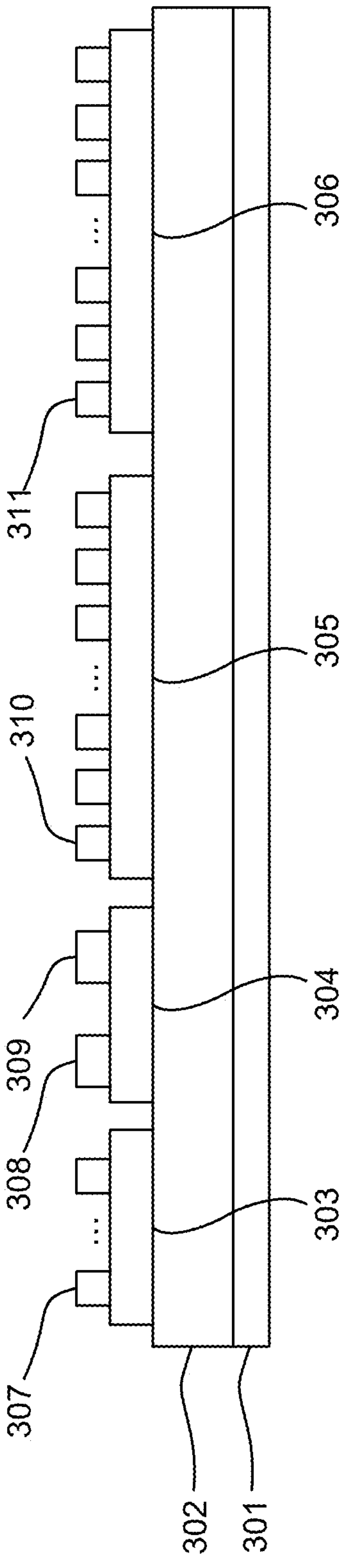
FIG. 3 An exemplary sensor cross-section view with coating arrange of different functional units.

FIG. 3. Illustrates an exemplary coating geometry of the sensor chipset from cross-section view. On the bottom is an electrical conductive layer with isolating etching to allow selective conducting to different zones and metal bays (301). Above the bottom layer is a layer of ceramic which provides high isolation to electricity (302). Several holes and loops are etched within this ceramic layer, allowing connection between the bottom layer bays to upper layer functional zones. Above are four conductive islets (303-306) that carry UV emitting metal oxide zone (307), light detection zone (304) with both CMOS (308) and InGaAs (309), visible light-emitting zone (310), and near-infrared light-emitting zone (311).

The "bays" as described herein are positions on the sensor chip where an LED or electrical component may be deposited and functionally connected to the sensor. More generally, "bays" may be a pad or via allowing for the LED or component to be deposited or connected to the circuitry of the sensor as desired or required. The "bay" may be a flat pad or may be a raised or recessed feature having an opening or surface for deposition of one or more layers of material. The term "bay" is not intended to be limiting and any appropriate construct for deposition of the LED or connection to an electrical component is contemplated.

Figure 4:
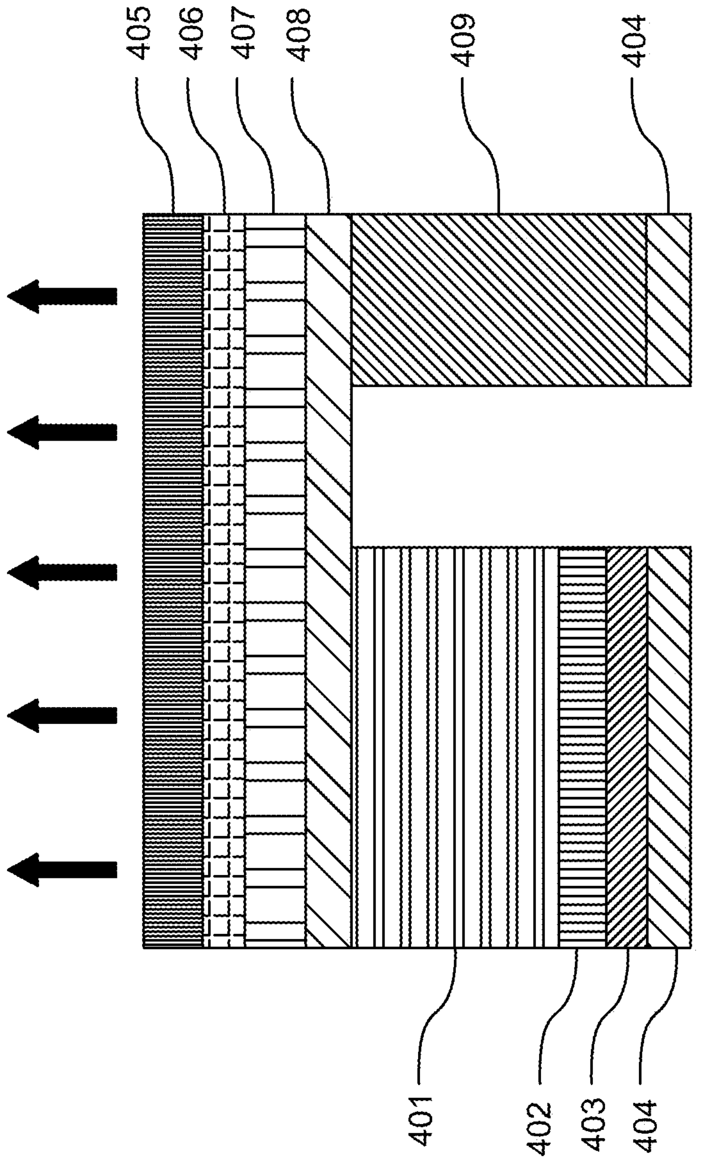
FIG. 4 An exemplary coating arrangement of UV emitting metal oxides materials.

The details of the layered structure of the UV emitting metal oxide zone are illustrated in FIG. 4. There are p-electrode (401-403) and n-electrode (409), both adhering to the metal bay on the sensor via a layer of conducting Tin (404), which also functions as protecting shell. The emission energy is mainly determined by the metal oxide layers (406-408), which provide emission of light through the cover protection layer (405) on the top. In the depicted embodiment, layer 406 corresponds to a layer of a first metal oxide material, layer 407 corresponds to an intermediate layer having a mixture of a first and a second metal oxide material, and layer 408 corresponds to a layer of the second metal oxide material. In an embodiment, a single metal oxide layer is present. In an alternative embodiment, two or more metal oxide layers are present, optionally with layers having mixtures of metal oxide materials. In alternative embodiments, 1-5 metal oxide layers are present. Each of the plurality of UV-emitter bays may independently have a different number of metal oxide layers of any appropriate metal oxide emitter. Alternatively, UV emitters which are not metal oxides may be utilized as would be appreciated by a person of skill in the art.

Figure 5:
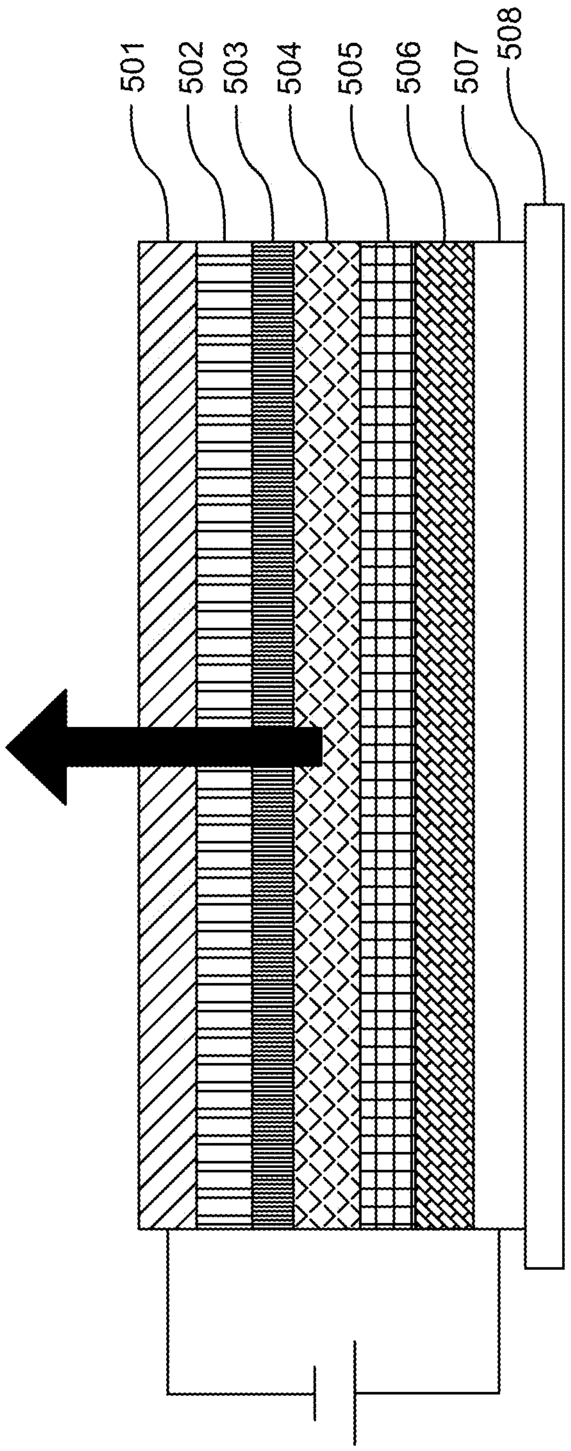
FIG. 5 An exemplary coating arrangement of organic light-emitting materials.

The details of the layered structure of the visible and near-infrared organic light-emitting zone is illustrated in FIG. 5. The top layer is a transparent conducting anode (501) and the bottom layer is a metal conducting cathode (507). Between them are an n-type layer (502,503) and a p-type layer (505,506), separated by an organic light-emitting materials layer (504). The types and chemical structures of molecules used in this layer determine the emission energy/wavelength of the coating windows, resulting in a series of different emission windows from visible to mid-NIR (400-1700 nm).

Figure 6:
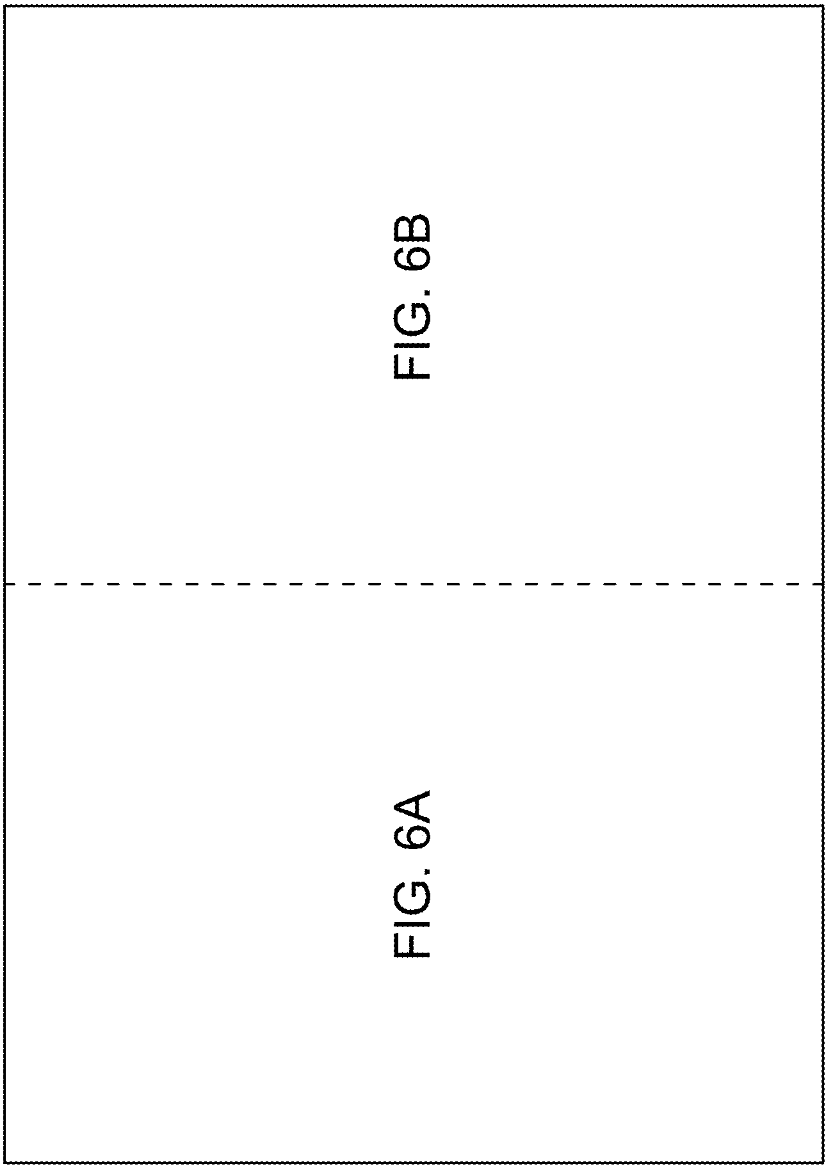
FIG. 6 illustrates an exemplary the emission spectrum of all 44 light-emitting units in an intensity-wavelength order. For convenience to show the exemplary emission spectrum on a reasonable scale, the spectrum was divided into FIG. 6A and FIG. 6B to show the spectrum across the x-axis, with FIG. 6 showing how the spectrum is divided in FIGS. 6A and 6B along the dashed line.
Figure 6A:
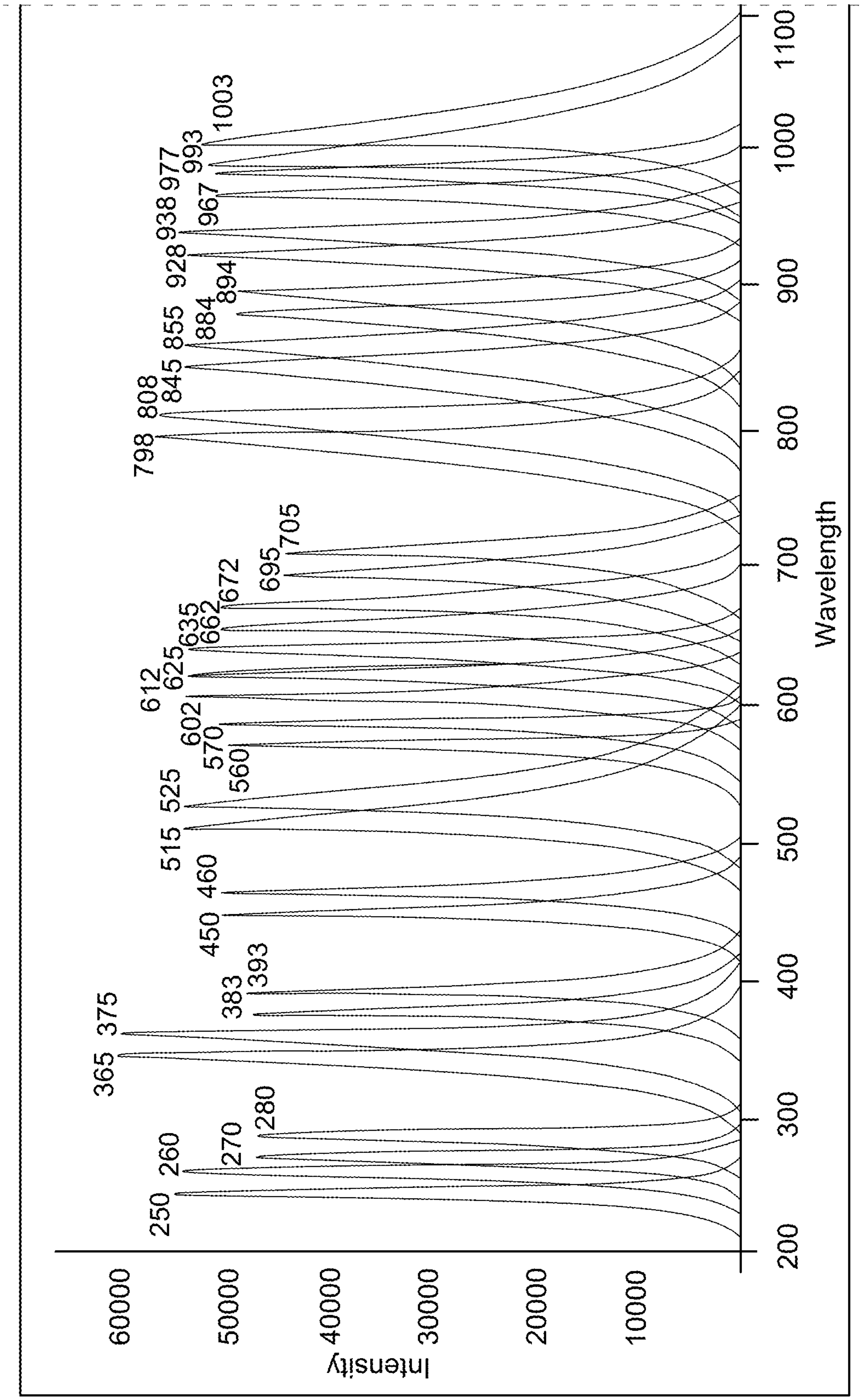
Figure 6B:
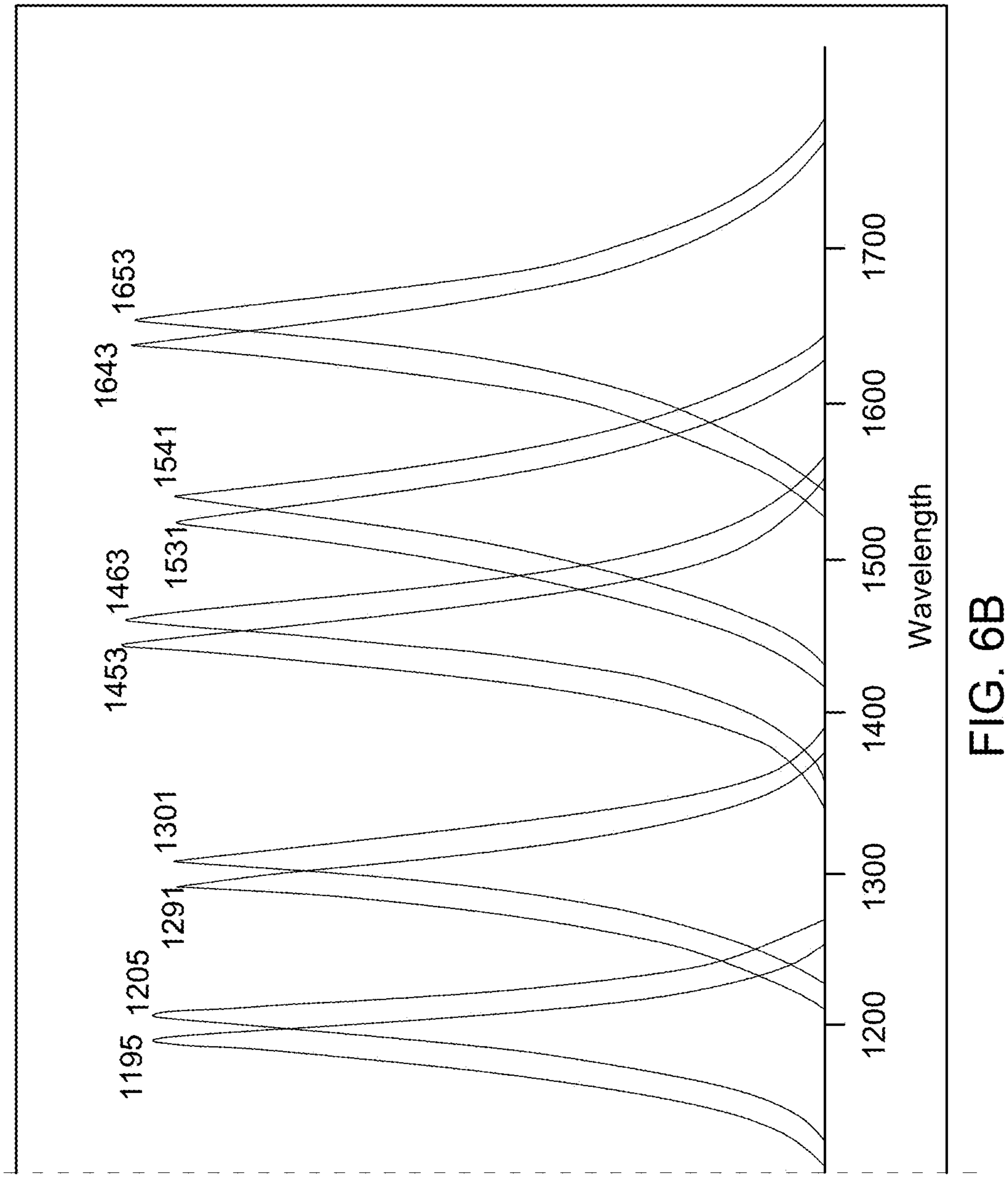

An exemplary full emission spectrum of all lighting functional zones is presented in FIG. 6. There are 44 emission peaks in total, with the center wavelengths ranging from 250 nm to 1653 nm. Since each peak has 100 nm to 200 nm in width at the full peak width, they cover the entire wavelength range from 200 to 1700 nm. It can be appreciated that any appropriate emitters can be utilized in accordance with the sensor architecture disclosed herein to achieve coverage of the 200 to 1700 nm spectral range. A person of skill in the art would also appreciate that emission characteristics may be tunable by controlling various manufacturing aspects including layer thickness, overall emitter size, and other factors.

Any emitter which emits light in the range of 200 nm to 1700 nm is contemplated for use herein. With respect to the UV emitters, metal oxides are exemplified. Binary, ternary, quaternary, doped (including metal-doped, sulfur-doped, nitrogen-doped, or any other dopant), defect-induced (including metal and/or oxygen vacant), composite, and any other metal oxide is contemplated. Other semiconductors having appropriate emission characteristics may be substituted for one or more of the metal oxides. The emitters may be present as one or more polymorphs and/or may be amorphous. Various semiconductor materials and their emission characteristics (determined, approximately, by their approximate bandgap) are known. Some non-limiting examples of various UV-emitters contemplated for use are CuO, GaN, AlN, AlGaN, InAlGaN, GeN, InGeN, $Cr_2O_3$, $Fe_2O_3$, ZnO, PbO, $Bi_2O_3$, $TiO_2$, $Cu_2O$, $ZrO_2$, $SnO_2$, $WO_3$, $SrTiO_3$, SiC, $BaTiO_3$, $B_{12}As_2$, $LiNbO_3$, ZnS, including compositional variants and varying oxidation states thereof. The UV emitter may be nanostructured (nanoparticles, layers, quantum dots, nanowires, etc) or deposited using any known techniques. One or more emitters may be mixed.

The visible and NIR emitters may be semiconductors, inorganic materials or complexes (such as metal chelates), organic complexes, polymers, or any know emitters. Complexes or chelates of Au, Pt, Pd, Ag, Cu, and Ni are non-limiting examples of suitable emitters. Oxo- or Dioxo-complexes or chelates of W, Ru, and Ir are further non-limiting examples of suitable emitters. Coordination complexes of polycyclic aromatic and heteroatom-substituted polycyclic aromatics are also contemplated (where heteroatoms are typically N or O, and in some cases S). For example, coordination complexes of naphthalene, anthracene, phenanthrene, chrysene, pyrene, benzopyrene, and other polycyclic aromatics, each optionally substituted with one or more heteroatoms, are contemplated, including mixed-ligand complexes. Polycyclic aromatic and heteroatom-substituted polycyclic aromatic complexes may have anywhere from one to about 10 fused rings and may be substituted at any position with one or more substituents such as alkyl, nitro, halo, chloro, bromo, fluoro, trifluoromethyl, difluoromethyl, amine, hydroxy, and aryl, including substituted aryls. Any useful visible and NIR emitters are contemplated and are not limited to the specifically recited emitters, and any of the preceding emitters in this paragraph are contemplated as “organic emitters”. The visible and NIR emitters may alternatively be thin layer, quantum dots, nanowires, or nanoparticles of inorganic materials such as AlN, AlGaN, InAlGaN, PbS, PbO, CdS, CdO, CuO, CdSe, or $CuInS_2$, or may be perovskites, 2D materials, or other materials. Polymeric emitters such as derivatives of poly(p-phenylene vinylene), polyfluorene, poly(naphthalene vinylene), and others are contemplated.

Various emitter materials and methods of manufacture are known, such as in “The Fundamentals and Applications of Light-Emitting Diodes”, Aug. 15, 2020, Elsevier Science, pages 1-284 (ISBN 012819605X, 9780128196052); “Organic Light-Emitting Diodes (OLEDs)”, 2013, Woodhead Publishing Series in Electronic and Optical Materials, pages 1-647 (ISBN 978-0-85709-425-4); “Nitride Semiconductor Light-Emitting Diodes (LEDs)—Materials, Technologies, and Applications”, 2nd edition, Oct. 24, 2017, Woodhead Publishing, pages 1-822 (ISBN 9780081019436); and Schubert, F. “Light-Emitting Diodes”, 3rd edition, Feb. 3, 2018, Publisher: E. Fred Schubert, sections 1-39 (ISBN 978-0-9 863826-6-6), and elsewhere.

Figure 7:
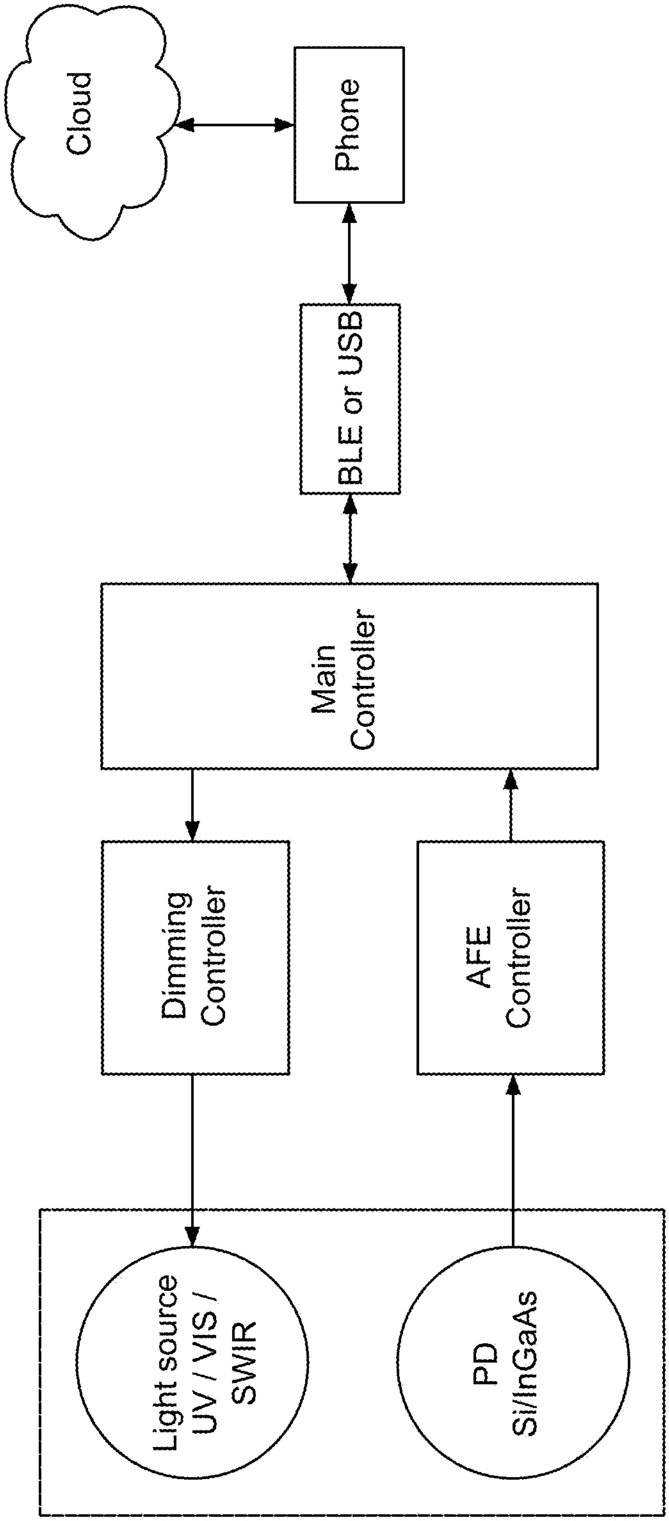
FIG. 7 illustrates an exemplary schematic drawing of the control circuit function flows.
Figure 8:
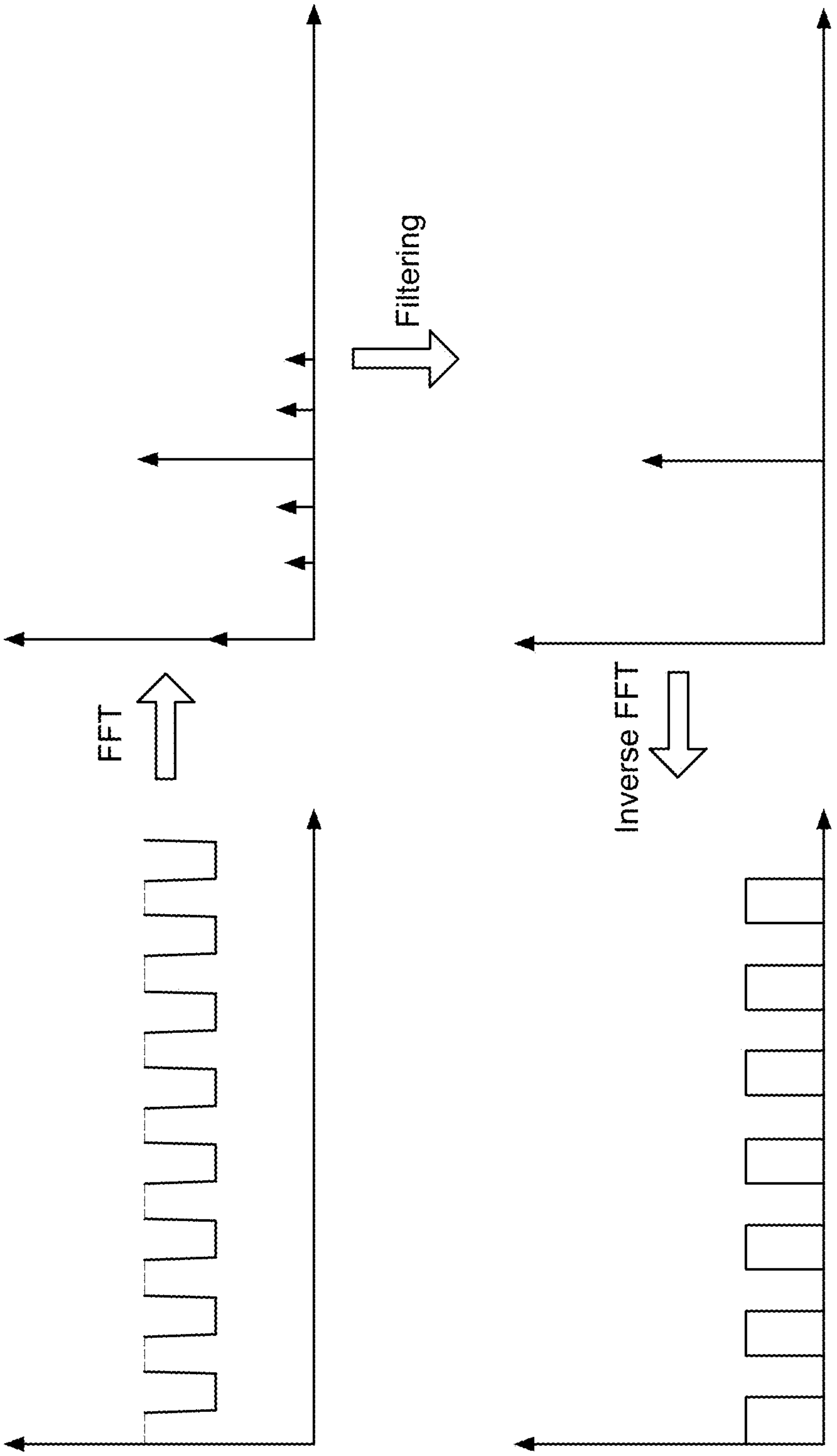
FIG. 8 illustrates a Fourier transform filtering process to remove environmental noise.

FIG. 7. shows a schematic drawing of an exemplary circuit controls flow diagram. The lighting functional zones are controlled by a dimming controller to provide emission sequence in time series, and the detection functional zone is controlled by an analog front-end (AFE) controller to utilize the right window to pick up the correct signals in the time domain. The signals are then passed to the main controller for further processing before transmission to internet/cloud-connected appliances/gadgets via BLE or USB. One of the major processing handled by the main controller is the Fourier transform filtering, which is schematically shown in FIG. 8. Each emission light is digitally modulated at a certain frequency to avoid the usual frequency of home and industrial lighting. For example, frequencies such as 10-40 and 70-90 Hz may be utilized in environments where environmental noise may be present at 50, 60, 100, and 120 Hz. It can be appreciated that any useful modulation frequencies which avoid environmental noise are contemplated.

While one aspect of modulating the emitter output is for noise removal, another aspect is the more than one emitter may be utilized simultaneously by modulating them at different frequencies. In an embodiment, between 1-5 emitters may be active simultaneously and operating on different frequency modulation channels separable by Fourier filtering. Generally, the maximum number of emitters which may be active simultaneously depends upon the detector saturation and may vary depending upon the specific detectors, LED output, geometry, etc.

Figure 9:
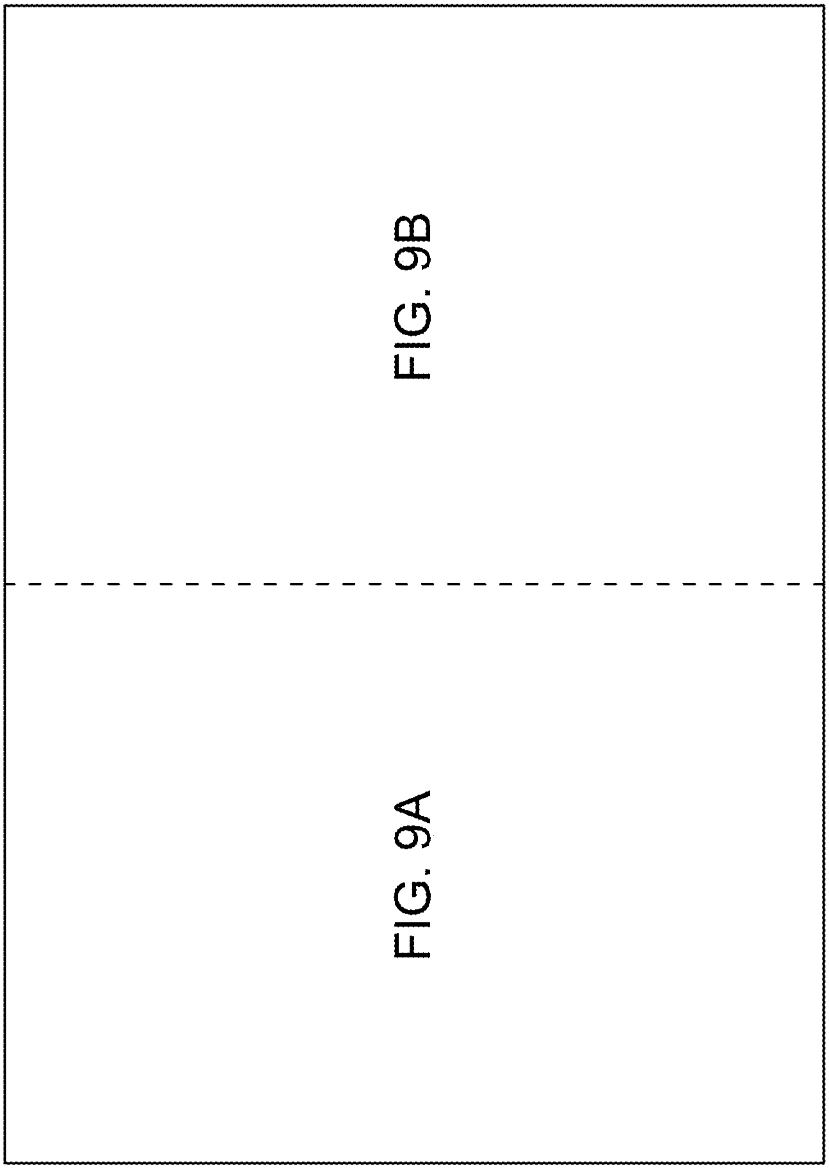
FIG. 9 shows a typical example of reconstructed full-spectrum data from the spectral sensor. For convenience to show the reconstructed spectrum on a reasonable scale, the spectrum was divided into FIG. 9A and FIG. 9B to show the spectrum across the x-axis, with FIG. 9 showing how the spectrum is divided in FIGS. 9A and 9B along the dashed line.
Figure 9A:
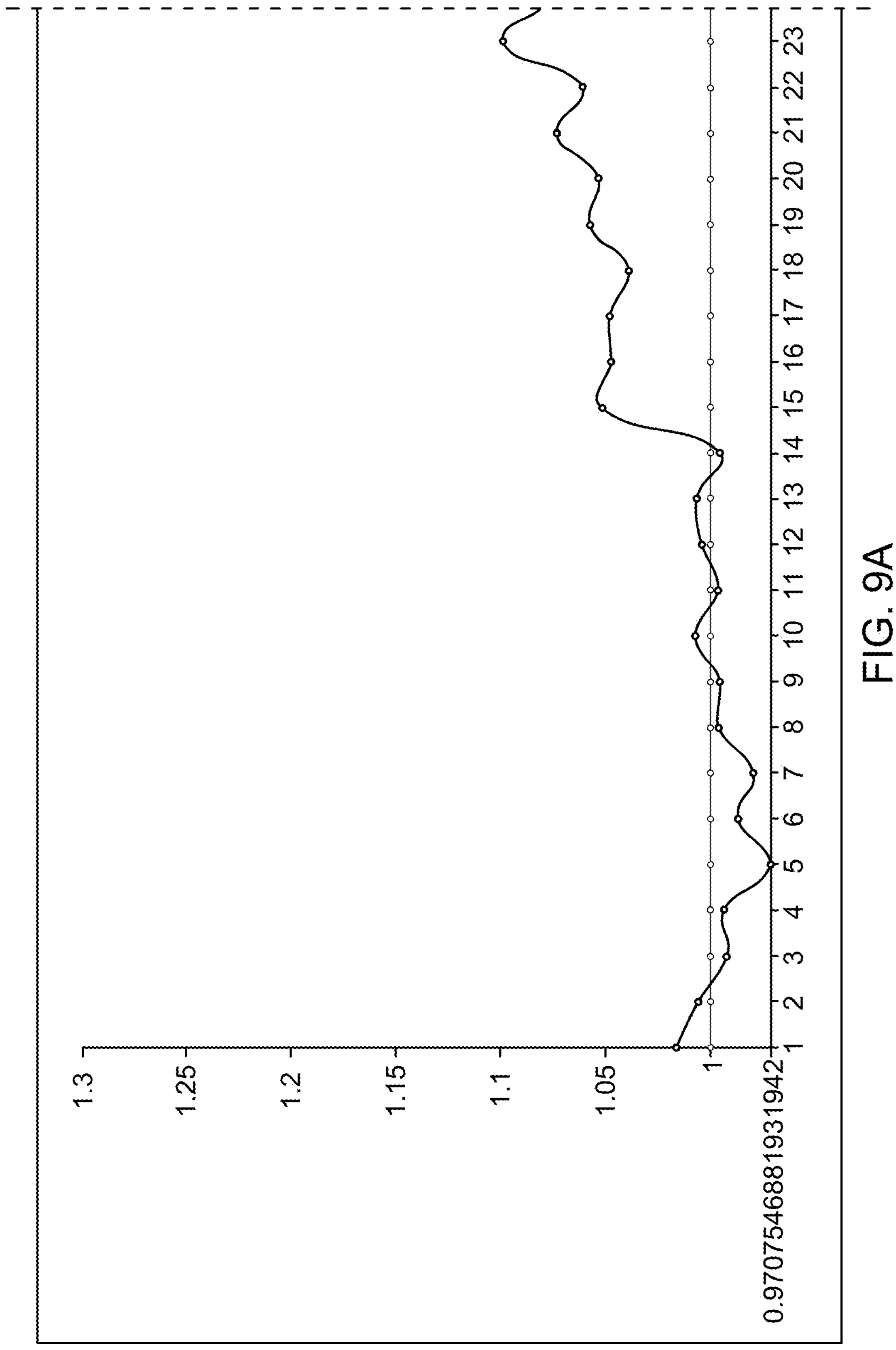
Figure 9B:
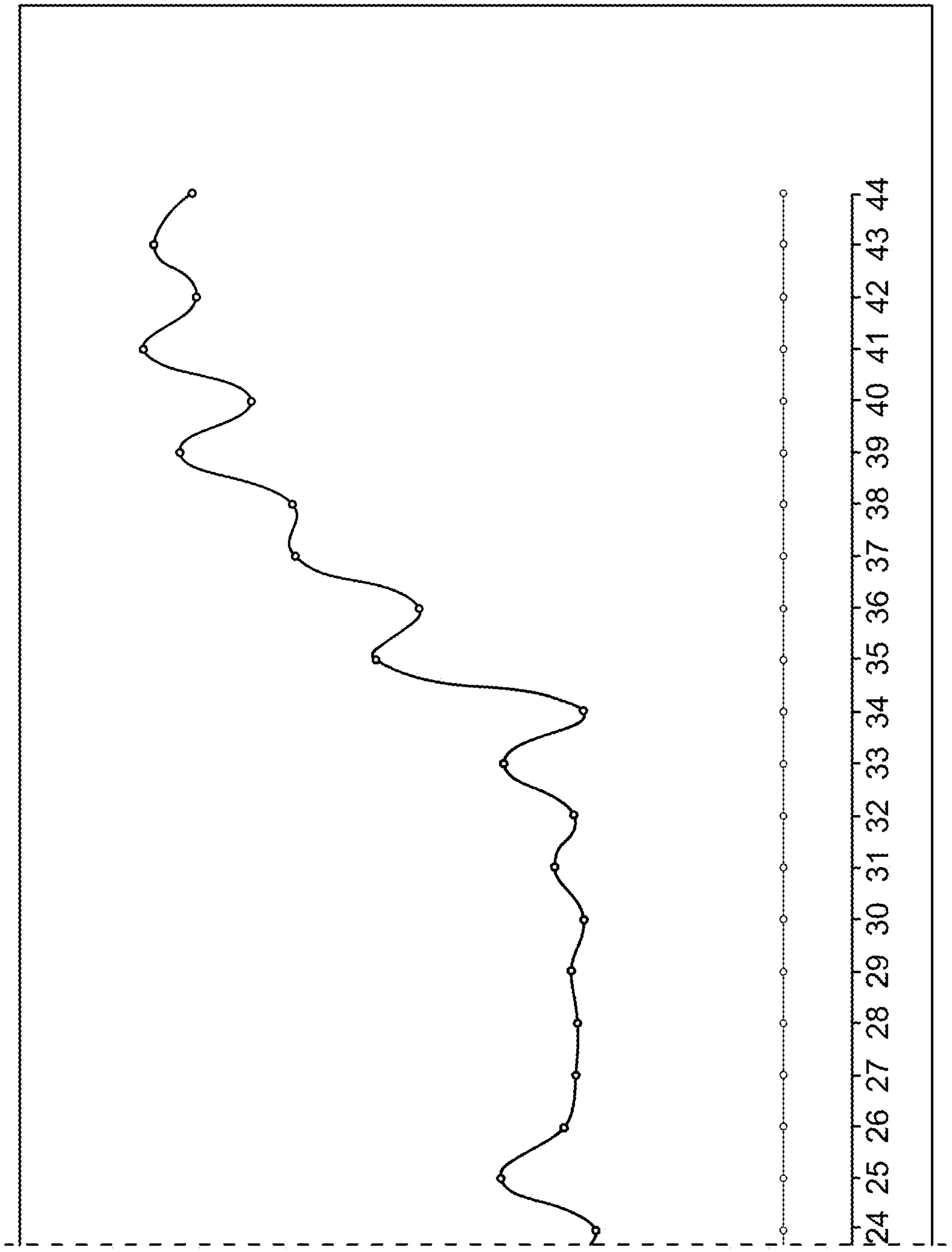
Figure 10:
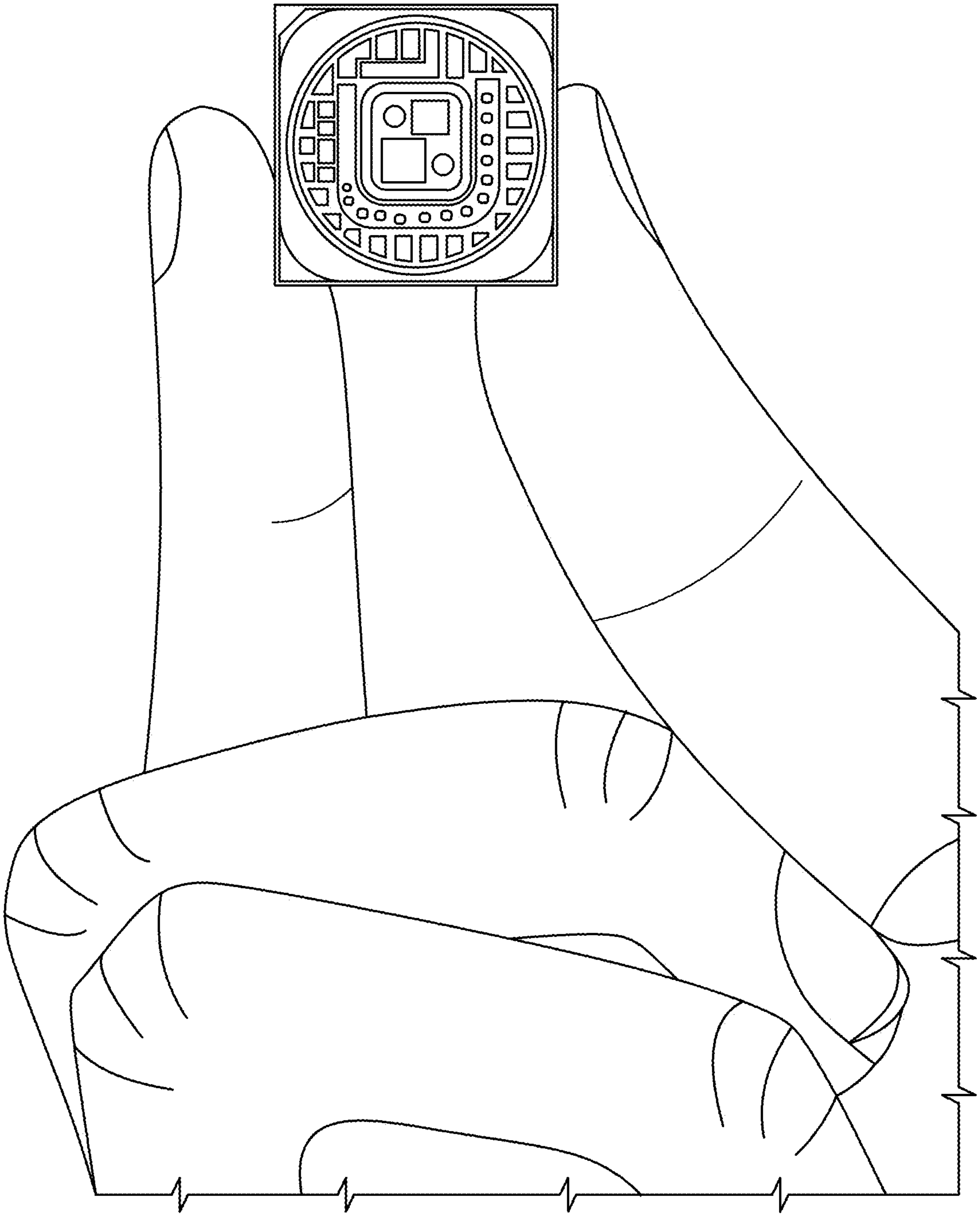
FIG. 10 shows an exemplary prototype spectral sensor being held by a human hand and its relative size compared to the hand.

After the Fourier transformation, abnormal frequencies from environments are removed, resulting in noise removal in the output signal after the reverse Fourier transformation. The returned discrete spectral data array is then fit with Gaussian elements to yield the final spectrum output, one type of which is displayed in FIG. 9.

In one or more embodiments, the sensor system of these teachings includes three different light-emitting functional zones physically separated on a gold-coated Aluminum nitride ceramic substrate, corresponding to a high current UV light-emitting zone, a visible light-emitting zone, and a near-infrared light-emitting zone. The light-emitting functional zones are arranged surrounding or circumscribing a plurality of detectors, in some embodiments in a roughly circular shape, with different packing/coating architectures, a detection functional zone having the detectors being in the center. The detection functional zone composes of two major parts, one consists of a signal channel CMOS and a reference channel CMOS (covering the detection of light from 200-950 nm), and the other consists of a signal channel InGaAs and a reference channel InGaAs (covering the detection of light from 950-1700 nm). The detection functional zone is isolated from the light-emitting zones by a circular metal or opaque (i.e. opaque to radiation in the 200-1700 nm range) wall. The entire functional zones are covered and protected by UV-NIR transparent glass, which is also filled with pure inert gas such as nitrogen gas to avoid oxygen and humidity in the air and to ensure a longer lifetime and better stability/reproducibility. Different light-emitting windows are individually controlled by digital modulation, with frequencies that allow detection from more than one emitter at the same time. The environmental noise with abnormal frequency can also be removed from the frequency domain after Fourier transformation. The overall spectral data yielded was allowed to a series of Gaussian shape fitting to reconstruct a continuous full spectrum.

In an exemplary method of use, a sensor is positioned with its emitters and detectors substantially facing an analyte, or substance or material for which spectral data is desired. Once positioned, the sensor is activated to collect spectral data. Activation can occur from one or more of a phone, computer, the cloud, or any other device connected with the sensor by any appropriate communications protocol including, for example, USB or Bluetooth (particularly Bluetooth low energy (BLE)). The main controller of the sensor and dimming controller function to power the emitters in accordance with pre-determined illumination schemes. The detectors may be continuously operating or may be powered in accordance with the illumination schemes by an analog front end (AFE) such that the correct detector is powered while emitters in its detection wavelength range are illuminated. The illumination schemes include one or more LED emitters operating concurrently at different modulation frequencies such that the signals from different emitters may be separated from one another and from environmental noise. The separation is performed by Fourier filtering in the main controller. Alternatively, the filtering may be performed as post-processing in another device or in the cloud. The spectral data may then be processed by gaussian fitting to produce spectral data.

Further analysis such as smoothing, peak-fitting or identification, etc. may be performed as necessary in devices connected to the sensor or in the cloud. Artificial intelligence (AI) such as machine learning or neural networks may be implemented to improve production of spectral data and/or analysis of spectral data.

Although specific features such as size, dimension, and arrangement are displayed in some drawings and not in others, this is for convenience only as each feature may be tuned, combined with any or all of the other features in accordance with the substantial principles. Other examples will easily occur to those skilled in the field and are within the scope of the invention.

INCORPORATION BY REFERENCE

The entire disclosure of each of the patent documents, including certificates of correction, patent application documents, scientific articles, governmental reports, websites, and other references referred to herein is incorporated by reference herein in its entirety for all purposes. In case of a conflict in terminology, the present specification controls.

EQUIVALENTS

The invention can be embodied in other specific forms without departing from the spirit or essential characteristics thereof. The foregoing embodiments are to be considered in all respects illustrative rather than limiting on the invention described herein. In the various embodiments of the present invention, where the term comprises is used, it is also contemplated that the embodiments consist essentially of, or consist of, the recited steps or components. Furthermore, the order of steps or the order for performing certain actions is immaterial as long as the invention remains operable. Moreover, two or more light-emitting and/or detections can be conducted simultaneously.

In the specification, the singular forms also include the plural forms, unless the context clearly dictates otherwise. Unless defined otherwise, all technical and scientific terms used herein have the same meaning as commonly understood by one of ordinary skill in the art to which this invention belongs. In the case of conflict, the present specification will control.

The invention claimed is:

1. A full wavelength range spectral sensor comprising:

(a) a gold-coated insulating substrate supporting four functional zones;

(b) a first functional zone comprising a plurality of ultraviolet (UV) emitters having an emission wavelength range of about 200 nm-about 400 nm, a second functional zone comprising a plurality of visible emitters having an emission wavelength range of about 400 nm-about 800 nm, a third functional zone comprising a plurality of near-infrared (NIR) emitters having an emission wavelength range of about 800 nm-about 1700 nm, and a fourth functional zone comprising first and second detection windows, wherein the first detection window comprises one or more CMOS detectors for detecting wavelengths in the range from about 200-about 950 nm and the second detection window comprises one or more InGaAs detectors for detecting wavelengths in the range from about 950 nm-about 1700 nm, (c) a barrier wall opaque to wavelengths in the range from about 200 nm-about 1700 nm circumscribed by the first, second, and third functional zones, the barrier wall circumscribing the fourth functional zone;

(d) a UV-NIR transparent glass covering the first, second, third, and fourth functional zones and defining an interior space filled with inert gas, optionally nitrogen; and (e) a micro-circuit to control illumination/detection, and optionally to further perform Fourier filtering.

2. The spectral sensor according to claim 1, wherein the insulating substrate is a ceramic substrate, and optionally wherein the ceramic substrate is an aluminum nitride substrate.

3. The spectral sensor according to claim 1, wherein the first functional zone is arranged at a top region of the substrate surface, a second functional zone is arranged below the first functional zone and on a first side of the substrate surface, and the third functional zone is arranged below the first functional zone and on a second side of the substrate surface, and wherein and the light detection zone is located substantially at the center of the substrate.

4. The spectral sensor according to claim 1, wherein each of the first functional zone, second functional zone, and third functional zone respectively comprise a plurality of bays.

5. The spectral sensor according to claim 4, wherein the first functional zone comprises from 4 to 16 bays, or alternatively no less than 4 bays, each bay comprising one or more of the plurality of UV emitters.

6. The spectral sensor according to claim 5, wherein the first functional zone has eight individual bays.

7. The spectral sensor according to claim 5 wherein the UV emitters are metal oxide materials supporting large electrical current during operations.

8. The spectral sensor according to claim 6, wherein the plurality of UV emitters comprises eight emitters, the emitters encompassing emission centers of about 250 nm, 260 nm, 270 nm, 280 nm, 365 nm, 375 nm, 383 nm, and 393 nm, each ±6 nm.

9. The spectral sensor according to claim 4, wherein the second functional zone comprises from 8-20 bays, or alternatively no less than 8 bays, each bay comprising one or more of the plurality of visible emitters.

10. The spectral sensor according to claim 9 wherein the visible emitters are organic light-emitting materials.

11. The spectral sensor according to claim 9 wherein the second functional zone has twelve bays.

12. The spectral sensor according to claim 11, wherein the plurality of visible emitters comprises sixteen emitters arranged within the twelve bays, eight being arranged as single layers of one of the plurality of visible emitters and eight being arranged as double layers of two of the plurality of visible emitters, the emitters encompassing emission centers of about 450 nm, 460 nm, 515 nm, 525 nm, 560 nm, 570 nm, 602 nm, 612 nm, 625 nm, 635 nm, 662 nm, 672 nm, 695 nm, 705 nm, 798 nm, and 808 nm, each ±6 nm.

13. The spectral sensor according to claim 4, wherein the third functional zone comprises from 4 to 16 bays, or alternatively no less than 10 bays, each bay comprising one or more of the plurality of NIR emitters.

14. The spectral sensor according to claim 13 wherein the NIR emitters are organic light-emitting materials.

15. The spectral sensor according to claim 13, wherein the third functional zone has ten bays, each bay comprising one or more of the plurality of NIR emitters.

16. The spectral sensor according to claim 15, wherein the plurality of NIR emitters comprises twenty emitters arranged within the ten bays, each bay comprising two of the plurality of emitters, the emitters encompassing emission centers of about: 845 nm, 855 nm, 884 nm, 894 nm, 928 nm, 938 nm, 967 nm, 977 nm, 993 nm, 1003 nm, 1195 nm, 1205 nm, 1291 nm, 1301 nm, 1453 nm, 1463 nm, 1531 nm, 1541 nm, 1643 nm, and 1653 nm, each ±6 nm.

17. The spectral sensor according to claim 1, wherein the fourth (detection) functional zone has first and second CMOS detection windows (200-950 nm) and first and second InGaAs detection windows (950-1700 nm), wherein the first CMOS and first InGaAs detection windows are associated with a signal channel and the second CMOS and second InGaAs detection windows are associated with a reference channel.

18. The spectral sensor according to claim 1, wherein the first, second, and third functional zones are controlled by a dimming controller to provide emission sequence in time series, and wherein the fourth (detection) functional zone is controlled by an analog front-end (AFE) controller to utilize the right window to pick up the correct signals in the time domain, optionally wherein the signals are then passed to the main controller for further processing before transmission to internet/cloud-connected appliances/gadgets via BLE or USB.

19. The spectral sensor according to claim 1, wherein each of the plurality of UV emitters are independently selected from semiconductors, quantum dots, nanoparticles, nanorods, and nanowires.

20. The spectral sensor according to claim 1 wherein the visible and NIR emitters are organic emitters selected from fluorescent dyes, phosphorescent dyes, organic compounds, coordination complexes, conductive polymers, quantum dots, nanoparticles, nanorods and nanowires.

21. The spectral sensor according to claim 1, wherein the micro-circuit comprises a main controller to perform Fourier transform filtering, which digitally modulates each emission light with a special frequency to avoid the usual frequency of home and industrial electricity, and wherein, after the Fourier transformation, abnormal frequencies from environments are removed, resulting in noise removal in the output signal after the reverse Fourier transformation.

22. The spectral sensor according to claim 21, wherein the returned discrete spectral data array is then fit with Gaussian elements to yield the final spectrum output.

23. A system for performing substance analyses comprising:

(a) a spectral sensor according to claim 1;

(b) a BLE or USB connect mobile device or computer; and (c) a cloud based artificial intelligence for spectral data analyses/interpretation, wherein the spectral sensor is operational over a plurality of wavelengths selected from about 200 nm to 1700 nm.

24. A method of performing spectral analysis of a substance comprising:

(a) obtaining a sensor chip comprising a plurality of LED emitters, two (signal and reference) CMOS detectors, and two (signal and reference) InGaAs detectors on a front surface thereof;

(b) orienting the front surface of the sensor to substantially face the substance;

(c) modulating one or more or a plurality of LED emitters on the sensor chip simultaneously at different frequencies;

wherein the modulated LED emitters emit light within the wavelength range from about 200-950 nm or from about 950-1700 nm;

(d) detecting, by either the CMOS detectors (200-950 nm) or InGaAs detectors (950-1700 nm), a spectral response;

(e) separating, by Fourier filtering, the spectral responses of each emitter; and (f) constructing, by gaussian peak fitting, a spectrum based upon the separated spectral responses of each emitter.

* * * * *